US009661731B2

(12) United States Patent
Hollberg

(10) Patent No.: US 9,661,731 B2
(45) Date of Patent: May 23, 2017

(54) COOLING TUBE FOR A PLASMA ARC TORCH AND SPACER

(71) Applicant: Manfred Hollberg, Goldach (CH)

(72) Inventor: Manfred Hollberg, Goldach (CH)

( * ) Notice: Subject to any disclaimer, the term of this patent is extended or adjusted under 35 U.S.C. 154(b) by 0 days.

(21) Appl. No.: 14/361,882

(22) PCT Filed: Apr. 27, 2013

(86) PCT No.: PCT/EP2013/001277
§ 371 (c)(1),
(2) Date: May 30, 2014

(87) PCT Pub. No.: WO2013/167244
PCT Pub. Date: Nov. 14, 2013

(65) Prior Publication Data

US 2015/0102020 A1 Apr. 16, 2015

(30) Foreign Application Priority Data

May 7, 2012 (EP) .................................... 12003596

(51) Int. Cl.
*B23K 10/00* (2006.01)
*H05H 1/28* (2006.01)
*H05H 1/34* (2006.01)

(52) U.S. Cl.
CPC ................ *H05H 1/28* (2013.01); *H05H 1/34* (2013.01); *H05H 1/3405* (2013.01); *H05H 2001/3436* (2013.01)

(58) Field of Classification Search
CPC .. H05H 1/28; H05H 1/34; H05H 1/26; H05H 2001/3436; H05H 1/3405
USPC ........ 219/121.48, 121.5, 121.51, 121.49, 75, 219/121.52; 313/231.41, 231.51; 315/111.21
See application file for complete search history.

(56) References Cited

U.S. PATENT DOCUMENTS 3,668,354 A * 6/1972 Meermans .............. H01H 1/62 200/289
4,625,094 A 11/1986 Marhic et al.
(Continued)

FOREIGN PATENT DOCUMENTS

EP 2082622 B1 4/2012
FR 2534106 A1 4/1984
(Continued)

*Primary Examiner* — Mark Paschall
(74) *Attorney, Agent, or Firm* — Browdy and Neimark, PLLC

(57) ABSTRACT

The invention relates to a cooling pipe for a plasma arc torch, comprising a hollow cylindrical electrode body having a central internal core, at the front end of which an electrode core holder having an electrode core inserted therein is arranged, and a hollow cylindrical cooling pipe which is inserted into the internal bore in a sealing manner and which features an internal bore that form a cooling channel as a feed and, in the intermediate space between the outer circumference of the internal bore and the inner circumference of the electrode body, forms a cooling channel formed as a return, wherein the cooling pipe has, on the inner side thereof that is facing the electrode core holder, space-maintaining means (e.g. a spacer washer or wires or rods), which are suitable to rest on the front end of the electrode core holder.

13 Claims, 4 Drawing Sheets

(56) References Cited

U.S. PATENT DOCUMENTS

| | | | | |
|---|---|---|---|---|
| 5,756,959 | A | 5/1998 | Freeman et al. | |
| 9,114,475 | B2 * | 8/2015 | Hollberg | B23K 10/00 |
| 2004/0200810 | A1 * | 10/2004 | Brandt | H05H 1/28<br>219/121.49 |
| 2008/0116179 | A1 * | 5/2008 | Cook | H05H 1/28<br>219/121.48 |
| 2012/0145680 | A1 * | 6/2012 | Warren, Jr. | B23K 10/00<br>219/121.44 |
| 2012/0248073 | A1 * | 10/2012 | Conway | H05H 1/28<br>219/121.49 |
| 2015/0083695 | A1 * | 3/2015 | Laurisch | H05H 1/34<br>219/121.49 |

FOREIGN PATENT DOCUMENTS

| | | | |
|---|---|---|---|
| GB | 2192821 | A | 1/1988 |
| WO | 02098190 | A1 | 12/2002 |
| WO | 2010/115397 | A2 | 10/2010 |

* cited by examiner

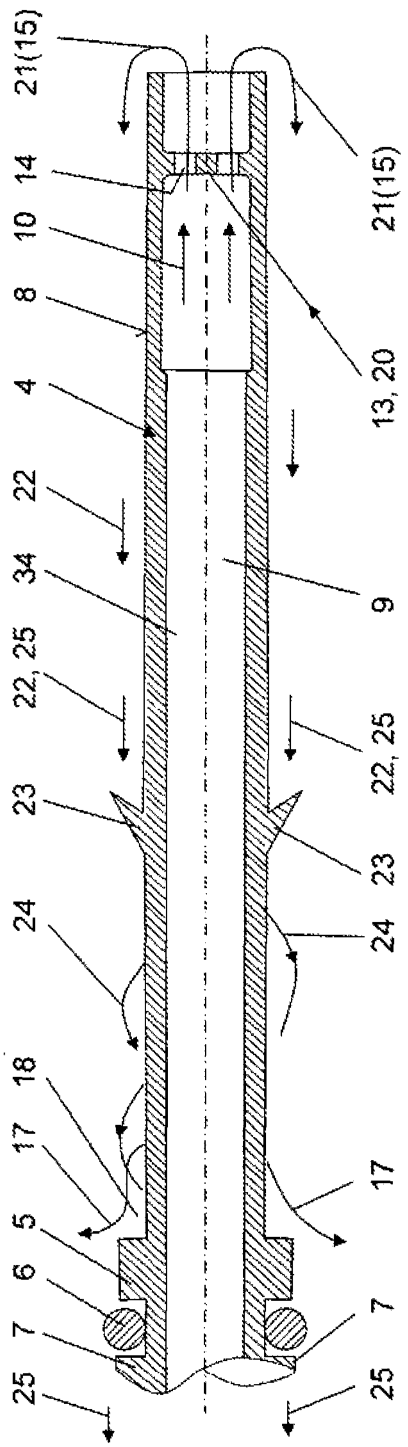
Fig. 3
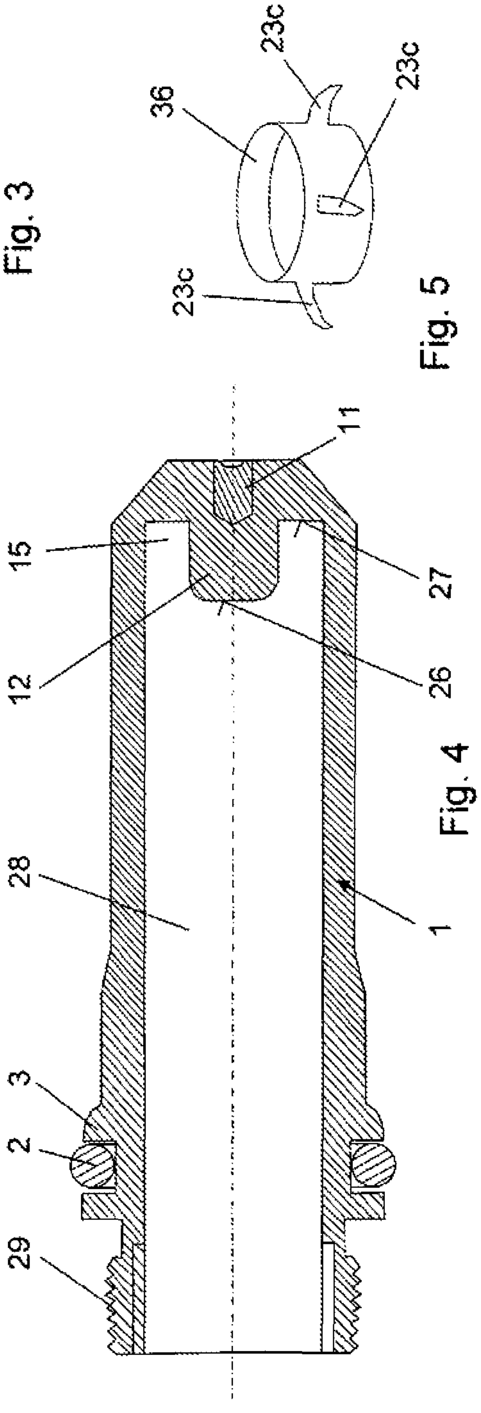
Fig. 5
Fig. 4

31
16
33
33
32
32
13
20
14
14
14
14
19
13
35

4
4
38
38
13a
23
23
4
38
38
38
38
13a
5
6

COOLING TUBE FOR A PLASMA ARC TORCH AND SPACER

FIELD

The invention relates to a cooling tube for a plasma arc torch. The invention further relates to a plasma electrode having a cooling tube inserted therein.

BACKGROUND

Such a plasma electrode with inserted cooling tube has become known, for example, with the subject matter of EP 2 082 622 B1. Reference is hereby made to that disclosure and the mode of operation of a plasma arc torch. It shall be deemed to be incorporated in its entirety in the disclosure of the present invention.

In the operation of plasma arc torches, the problem exists that the electrode core disposed on the front side of the electrode body in an electrode core holder is exposed to working temperatures reaching up to 1500° C. For this reason, the electrode body of the plasma electrode needs to be adequately cooled. This is accomplished according to the subject matter of EP 2 082 622 B1 in such a way that the plasma electrode in the form of a hollow cylindrical electrode body has inserted therein a likewise hollow cylindrical cooling tube, through which a coolant flow passes in the supply and return flow. The coolant flow is routed through the central internal bore of the cooling tube to the front in the direction of the electrode core holder of the electrode body, where it is deflected in the bottom end of the electrode body and flows back on the outside of the cooling tube and on the inner circumference of the electrode body.

The cooling tube is subjected to considerable thermal expansion, and care must be taken that during thermal expansion thereof it does not disrupt the coolant flow. For this purpose, EP 2 082 622 B1 proposes to provide the front face side of the cooling tube situated next to the electrode core holder with a spacer.

The spacer is formed in the bottom end of the electrode body as an insertable disk or as intersecting bars and is intended to form a stop surface for the front end of the cooling tube against the electrode body.

It is a disadvantage of this known spacer, however, that it must be inserted or press fit as a separate part into the electrode body, which is associated with increased expenditure of time and effort.

It is another disadvantage that it is not part of the cooling tube and does not take part in the longitudinal expansion of the cooling tube, which poses a risk that the front end of the cooling tube may come to rest on the spacer in a sealing manner, and the coolant flow is impaired as a result.

The invention is therefore based on the aim of improving a plasma electrode for a plasma arc torch of the type mentioned at the beginning in such a way that an improved spacing-maintaining support for the cooling tube in the interior of the hollow cylindrical electrode body is ensured.

To achieve this aim, the invention relates to a cooling tube for a plasma arc torch, comprising a hollow cylindrical electrode body having a central internal bore, at the front end of which an electrode core holder with an electrode core inserted therein is disposed, and a hollow cylindrical cooling tube inserted in a sealing manner into the internal bore, which in the internal bore thereof has a cooling channel configured as a supply passage and in the space between the outer circumference thereof and the inner circumference of the electrode body forms a cooling channel configured as a return passage, characterized in that the cooling tube on the side thereof facing toward the electrode core holder has spacing means (e.g. a spacer or a spacer disk or wires or rods) which are suitable for face-end engagement against the electrode core holder.

It is an essential feature of the invention that the cooling tube has on its inside facing towards the electrode core holder a spacer suited to engage against the electrode core holder. Accordingly, any spacing means that are suitable for a displacement-limiting engagement of the cooling tube against the electrode core holder are claimed as essential to the invention.

With the technical teaching herein a significant advantage is achieved over the prior art as shown in EP 2 082 622 B1, because, according to the invention, the spacing means is no longer part of the hollow cylindrical electrode body, but part of the cooling tube itself.

This spacer is incorporated in the form of, for example, a spacer disk in the interior of the cooling tube and therefore—because it is connected to the cooling tube in a fixed manner—takes part in the longitudinal expansion of the cooling tube. This was not possible in the prior art.

For this reason, an ever-constant flow of coolant through the cooling tube is ensured, irrespective of the rapidly changing linear expansion of the cooling tube which is directed with the front face side thereof sometimes more, sometimes less towards the bottom of the hollow cylindrical electrode body. If—as in the prior art—a fixed spacer disk is disposed in that region, this leads to an impairment of the coolant flow. This is avoided in the invention.

SUMMARY

In the invention, the spacing surfaces are, on the one hand, the surface of the electrode core holder of the plasma electrode and, on the other hand, an interior central surface of the spacer disk inserted into the cooling tube.

The cooling tube with the spacer disk inserted therein can move away sometimes more, sometimes less from the electrode core holder as a result of the linear expansion, without the coolant flow being substantially impaired.

In this embodiment, it is assumed that the rear end of the cooling tube is received in the electrode in a threaded, plug-type or clamp-type fastening device. Such a fastening device ensures a fixed, nearly displacement-free fit of the cooling tube.

In another implementation of the invention, the expansion play due to the thermal change in length of the cooling pipe which is clamped-in on one side in a fixed manner is not limited by the spacer disk according to the invention. Here it is provided that the cooling tube is displaceably received in the holder thereof on the electrode side and has an axial displacement play within the range of 0.1 to 10 mm.

In such a displaceably supported cooling tube, the problem exists to an even greater degree that an axial displacement in the direction towards the electrode core holder (in the direction towards the tip) may result in an impairment of the coolant flow. For this reason, the spacer disk on the cooling tube side, or the spacer disposed in that region, is important in order to limit the linear expansion of the cooling tube in the axial direction towards the front.

According to a further feature of the invention it is proposed additionally—or by itself—that the cooling tube, even if it undergoes a longitudinal displacement, is always pushed backwards into the rear holder thereof on the electrode side. This is effected by the pressure of the cooling medium acting on the cooling tube and pressure vanes disposed on the cooling tube.

In order to limit the frontal free movement of the cooling tube, it is provided in a preferred implementation of the invention according to a first embodiment that the spacer disk is connected integrally in terms of material to the cooling tube. This means that the spacer disk is formed of the same material as the cooling tube and is produced together therewith during the production of the cooling tube.

For example, if the cooling tube is produced by drilling from a rod-shaped metal material, the cylindrical interior of the cooling tube will be machined only up to the front side of the cooling tube near the spacer disk.

From the other, the shorter side of the cooling tube, a machining of the cooling tube likewise takes place in the longitudinal direction, such that ultimately in the vicinity of the tip of the cooling tube, but set back from the tip, a spacer disk that is connected integrally to the cooling tube in terms of material is produced by appropriate material machining of the cooling tube.

The spacer disk thus produced is characterized in that it has, in the manner of a sieve, a multiplicity of passage openings, but that the middle, central region is configured as a stop face which is associated with the stop surface of the electrode body on the side of the electrode core holder.

The electrode core holder of the plasma electrode is configured as narrow as possible in this region, in order to still offer a good holder for the electrode core inserted there, but on the other hand, ensure adequate coolant flow through the spacer disk past the electrode core holder out of the tip of the cooling tube.

In this way an optimum flow around the entire electrode core holder and around the electrode core which is heated in that region to a operating temperature above 1000° C. is ensured.

In another configuration of the invention it is provided that the spacer disc is not connected integrally in terms of material to the material of the cooling tube, but is releasably inserted as a part which is separate in terms of material in the cooling tube.

The spacer disk can be provided here with an external thread which cooperates with an associated internal female thread on the inner circumference of the cooling tube, such that the spacer disk can be easily screwed into the interior of the cooling tube.

In another configuration of the invention it may be provided that the spacer disk is clipped or snapped as a part that is separate in terms of material into the inside of the cooling tube.

In any case, this second embodiment provides that the spacer is releasably connected to the cooling tube.

This provides for an easy interchangeability of the spacer disk and that the spacer disk can be produced of a different material than, by comparison, the cooling tube itself.

The spacer disk may for example be composed of plastic or a plastic-metal composite.

The spacer disk may also be provided with an external thread and is screwed into an associated stop surface in the interior of the cooling tube. Lastly, an undercut groove may be incorporated in the interior of the cooling tube, into which undercut groove the spacer disk is snapped.

The above-described first feature of the invention (spacer disk in the interior of a cooling tube) refers to that, regardless of the temperature-induced change in length of the cooling tube, it is always ensured by means of a disk spacer connected to the cooling tube that a coolant flow uninfluenced by changes in temperature is passed over the electrode core holder.

Serving to achieve this aim is a second feature of the invention for which patent protection is sought by itself but also in combination with the first-mentioned feature.

This second feature is described in detail below:

It has been found that optimum guidance of the coolant flow—regardless of temperature-induced changes in length of the cooling tube—takes place when the spacer disk does not engage in a spacing manner against the front end surface of the electrode core holder of the plasma electrode.

Provision should therefore be made if possible that the cooling tube remains retracted to the rear in the direction towards the rear holder thereof, and the spacer disk comes into engagement with the stop surface thereof against the associated opposing contact surface of the electrode core holder only if and when required.

To achieve this, it is claimed according to the second feature of the invention that an automatic return force acts on the cooling tube, which return force—in the direction towards the rear holder of the cooling tube—is exerted by the coolant flow itself.

According to the invention it is provided that in the return channel which is formed on the outer circumference of the cooling tube and on the inner circumference of the hollow cylindrical bore of the electrode body, pressure vanes are disposed which are connected to the outer circumference of the cooling tube.

Because these pressure vanes are situated in the return channel, the returning coolant flows onto them, and the pressure vanes push the cooling tube in the direction of the longitudinal axis thereof against the rear fastening device thereof on the electrode side, which fastening device may be configured as a threaded or plug-type fastening device.

This compensates any potential axial play in the threaded or plug-type fastening device between the cooling tube and the electrode body, because the cooling tube, as a result of the pressure of the cooling medium and the pressure vanes disposed in the return channel, is always pressed into the in the fastening device thereof on the electrode side at a constant bias force.

As a result, the cooling tube is always pushed backwards into the holder thereof on the electrode side and the frontal spacer disk serving as the stop against the electrode core holder is lifted off the electrode core holder and remains at a certain distance from this electrode core holder.

As a result of this spacing the coolant also flows over the face end of the electrode core holder, because the spacer disk is situated with a certain gap relative to this front end of the electrode core holder, thereby allowing an optimized coolant flow over the electrode core holder.

The pressure vanes disposed in the return channel, which are connected to the outer circumference of the cooling tube either integrally in terms of material or releasably, may be formed straight, that is to say they may be situated with the vane surfaces thereof perpendicular in the coolant flow, so that an additional circular vortex flow in the return cooling channel is avoided.

In this case a straight component of force directed onto the cooling tube in the longitudinal direction against the fastening device of the cooling tube in the electrode body is generated onto the cooling tube. As a result, the threaded screw connection is biased in the axial direction.

If, however, in a further development of this embodiment, the pressure vanes are also tapered relative to the longitudinal axis of the coolant flow, the cooling medium flowing back in the return flow returns spirally downstream of the pressure vanes in the direction towards the coolant outlet, whereby in addition to the straight component of force generated in the axial direction of the cooling tube, a rotary (circular) component of force on the cooling tube is generated.

The rotational direction of this force component is preferably directed such that any threaded connection between the cooling tube and the electrode body is additionally biased in the sense of a solidification in the direction of rotation. As a result, an axial and a radial bias therefore exists on the threaded screw connection between the electrode body and the cooling tube.

As a result, on the one hand, any play is removed from this threaded screw connection, and on the other hand, this threaded screw connection is additionally biased in rotation in the tightening direction, thereby additionally securing this threaded screw connection.

In pressure vanes of this type that are tapered in the flow direction of the return channel, provision can also be made that the pressure vanes are not only tapered, but that they also generate in the manner of propellers a vortex cooling-medium flow produced downstream of the pressure vanes, whereby the cooling medium is passed spirally or helically about the outer circumference of the cooling tube and, in this case, on the one hand the cooling tube—as stated above—is given an additional rotary force component and the returning coolant flow is additionally given a swirl that accomplishes an accelerated discharge of the coolant flow from the coolant outlet.

The subject matter of the present invention derives not only from the subject matter of the individual claims but also from the individual claims taken in combination with each other.

All of the information and features disclosed in the documents, including in the Abstract, in particular the physical implementation illustrated in the drawings, are claimed as essential to the invention in so far as they are novel, whether separately or in combination, with respect to the prior art.

BRIEF DESCRIPTION OF THE DRAWING

The invention will now be described in detail with reference to drawings illustrating a number of ways of carrying out the invention. Further features essential to the invention and advantages of the invention will be apparent from the drawings and from their description.

In the drawings:

FIG. 3 shows the sectional view through the cooling tube according to FIG. 1 in a modified embodiment with illustration of additional functions FIG. 4 shows a sectional view through the electrode body according to FIG. 1 in a modified embodiment FIG. 5 shows a perspective view of a ring with pressure vanes

DETAILED DESCRIPTION

Figures 1, 2:
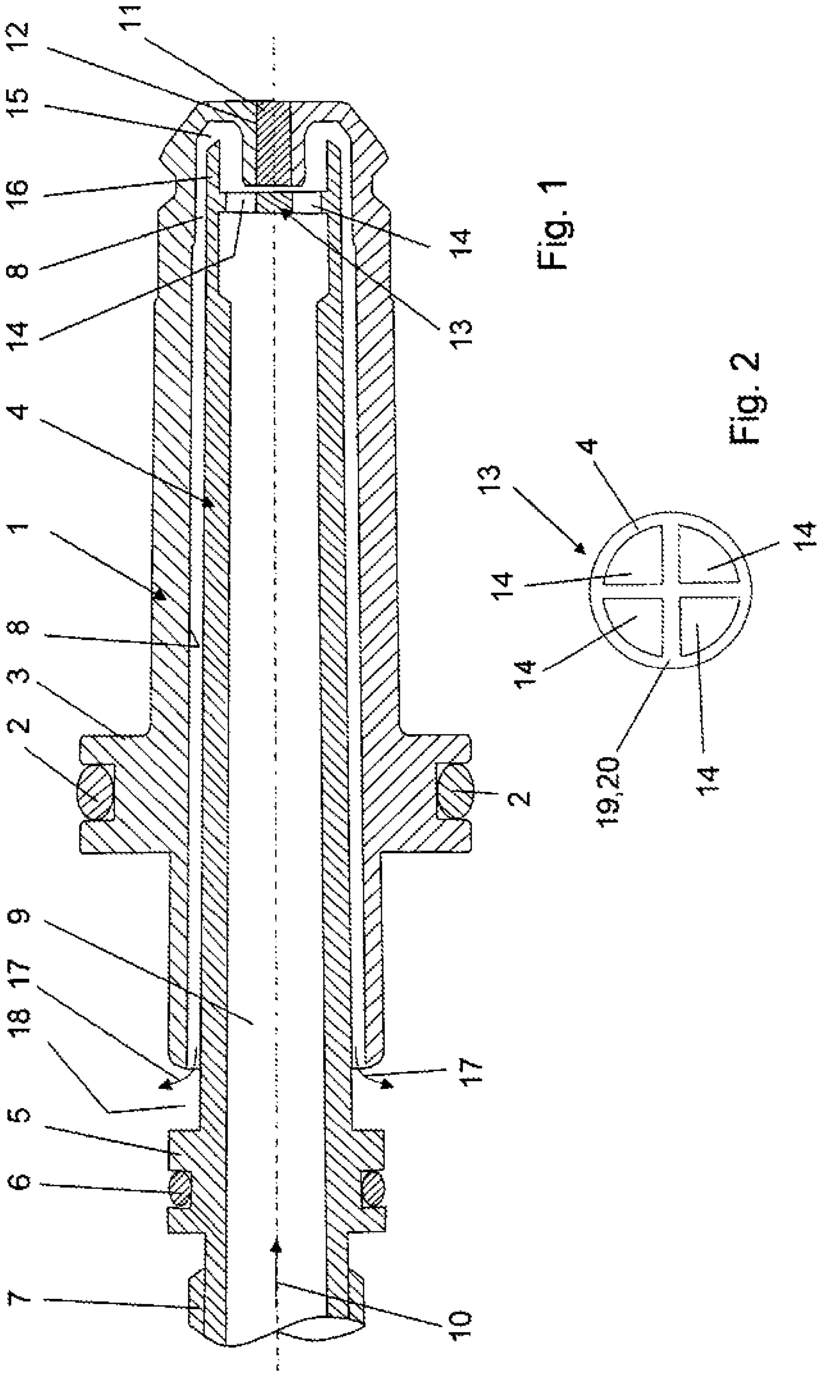
FIG. 1 shows a longitudinal section through a plasma electrode for a plasma arc torch in a first embodiment of a cooling tube
FIG. 2 shows the front view of the cooling tube shown in a sectional view in FIG. 1, with a spacer disk

FIG. 1 generally shows a plasma electrode for a plasma arc torch, wherein an approximately hollow cylindrical electrode body 1 carries in the region of a flange 3 seals 2 whereby it is inserted in a sealing manner into a non-depicted housing. The exact manner of fastening is shown in EP 2082622B.

According to FIG. 4, the electrode body 1 has a central internal bore 28 and forms at the front side thereof an approximately cylindrical electrode core holder 12 which is integrally connected to the remaining material.

Inserted into the electrode core holder 12 is an electrode core 11 consisting, for example, of hafnium. In the example embodiment according to FIG. 1 the electrode core 11 extends through the entire electrode core holder 12, while in the example embodiment according to FIG. 4 the electrode core 11 is configured shorter.

It is important in both embodiments according to FIGS. 1 and 4 that the electrode core holder 12 is preferably configured small in cross-section and otherwise cylindrical, in order to allow a good flow of the cooling medium over the surfaces thereof, as shown in FIG. 1.

The rear end of the electrode core holder 12 according to FIG. 4 forms a face end stop surface 26 for a spacer means which is installed in the cooling tube 4.

The cooling tube 4 in turn consists of a hollow cylindrical metal or plastic body, in the internal bore 34 (see FIG. 3) of which a cooling channel 9 is provided for the passage of a cooling medium which flows in the direction of arrow 10 into the internal bore 34.

The cooling tube 4 has at the rear end thereof a screw thread 7 and furthermore a sealing device having a gasket 6, which is arranged in the region of the flange 5.

Sealing by means of the gasket 6 is carried out in a manner not illustrated, such that a flows in the direction of arrow 17 from the cooling channel serving for the return flow 8 into an associated outlet 18 and is removed from there. Instead of a threaded connection, a plug-type connection can be provided.

According to the invention it is now provided that a spacer disk 13 is disposed in the interior of the cooling tube 4, at an axial distance from the frontmost tip 16, the spacer disk 13 in the illustrated embodiment of FIG. 1 being formed integrally with the material of the cooling tube 4. The spacer disk 13 is produced together with the cooling tube during machining thereof.

In FIG. 2, the spacer disk 13 is shown in a top view. It essentially comprises a center cross 19 which is integrally connected in terms of material to the material of the cooling tube 4 and comprises a multiplicity of passage openings 14 which are disposed in the intermediate space between the intersecting bars of the center cross 19.

The center cross 19 forms a centrical stop surface 20, which is associated with the stop surface 26 of the electrode core holder 12 according to FIG. 4.

In lieu of the passage openings 14 bounding each of the quadrants of the center cross, individual passage bores comprising one or more bores per quadrant can be provided.

The cooling medium entering in the direction of arrow 10 into the supply cooling channel 9 accordingly flows through the passage openings 14 in the spacer disk 13 and is deflected at the front end of the electrode body 1 in the region of a reverse path 15 and then flows back on the outer circumference of the cooling tube 3 in the direction of arrow 17 via the cooling channel 8 disposed there as a return passage.

The flow conditions are shown in detail in FIG. 3.

It can be seen that in the reverse path 15, the cooling medium is deflected in the direction of arrow 21 and flows back on the outer circumference of the cooling tube 4 in the direction of arrow 22, and in the process, after about ⅔ of the length of the cooling tube, encounters pressure vanes 23 disposed there.

Because these pressure vanes 23 are disposed evenly distributed on the circumference of the cooling tube and are situated in the cooling channel 8, a pressure force 25 directed in the longitudinal direction of the cooling tube towards the rear against the threaded fastening device 7 thereof, is exerted onto this threaded mounting device. One, two or more pressure vanes can be present.

FIG. 3 shows as a modified example embodiment the case where the pressure vanes 23 are not in the form of straight extension pieces, but are disposed tapered in the cooling channel 8. As a result of this taper, a spiral vortex flow is generated downstream of the pressure vanes 23, causing an additional rotational component to be exerted on the cooling tube 4 and this rotational component is directed such that the threaded connection to the screw thread 7 is solidified.

Figure 6:
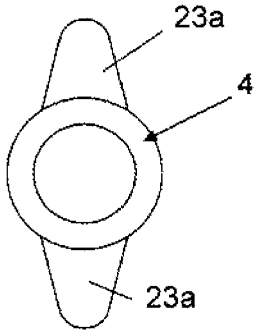
FIG. 6 shows the front view of the cooling tube at the height of the pressure vanes shown in FIG. 3

FIG. 6 shows the front view of the pressure vanes 23*a* of straight design, which accordingly generate only a straight, axially directed pressure force 25 in the direction of arrow drawn in FIG. 3 in the direction towards the rear threaded connection to the screw thread 7.

Figure 7:
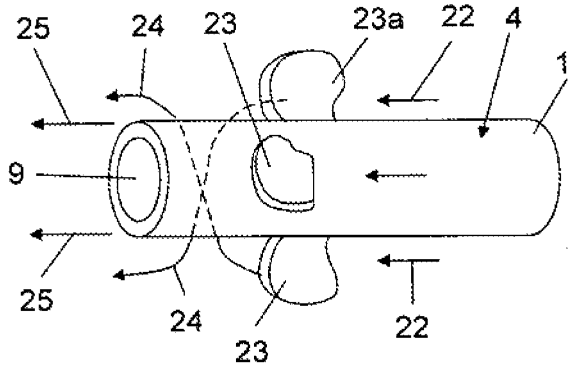
FIG. 7 shows an embodiment of pressure vanes modified from FIG. 5

Conversely, if the pressure vanes 23*a* in FIG. 7 are tapered, a vortex flow 24 according to FIG. 3 is generated.

Figure 8:
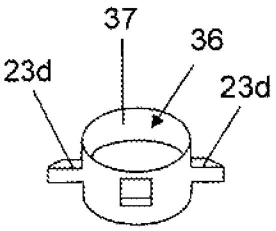
FIG. 8 shows a perspective view of a threaded ring with pressure vanes

FIG. 5 shows that pressure vanes 23, 23, 23*b*, 23*c*, 23*d* of any kind may also be disposed on the outer circumference of a ring 36. The ring 36 may be in the form of a plug-on ring which can be plugged or snapped onto the outer circumference of the cooling tube 4. FIG. 8 shows another embodiment of the ring 36, which is provided with an internal thread 37 which can be screwed onto an associated external thread on the cooling tube 4.

Figure 9:
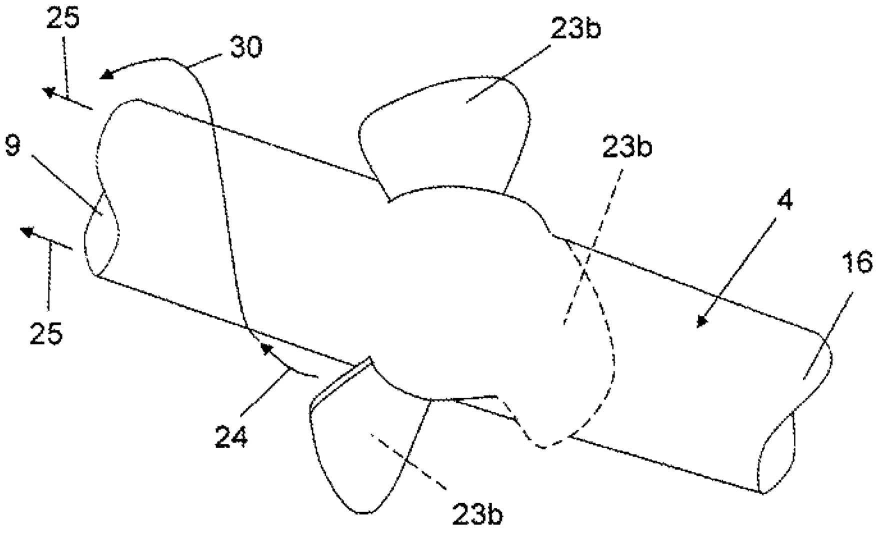
FIG. 9 shows an embodiment of pressure vanes in the manner of propeller wings, modified from FIGS. 5 and 6

FIG. 9 shows as a further embodiment propeller-shaped pressure vanes 23*b* which further intensify the vortex flow 24 and generate a torque 30 directed in closing direction 30 onto the threaded connection to the screw thread 7.

FIG. 4 also shows that the electrode body 1 in turn carries at the rear end thereof a threaded fastening device 29, whereby it is screwed in a sealing manner into an associated casing part of the plasma arc torch. A plug-type or clamp-type connection can be provided instead.

At the bore bottom 27 of the electrode body 1, the reverse path 15 is thus formed.

Figures 10, 11, 12, 13:
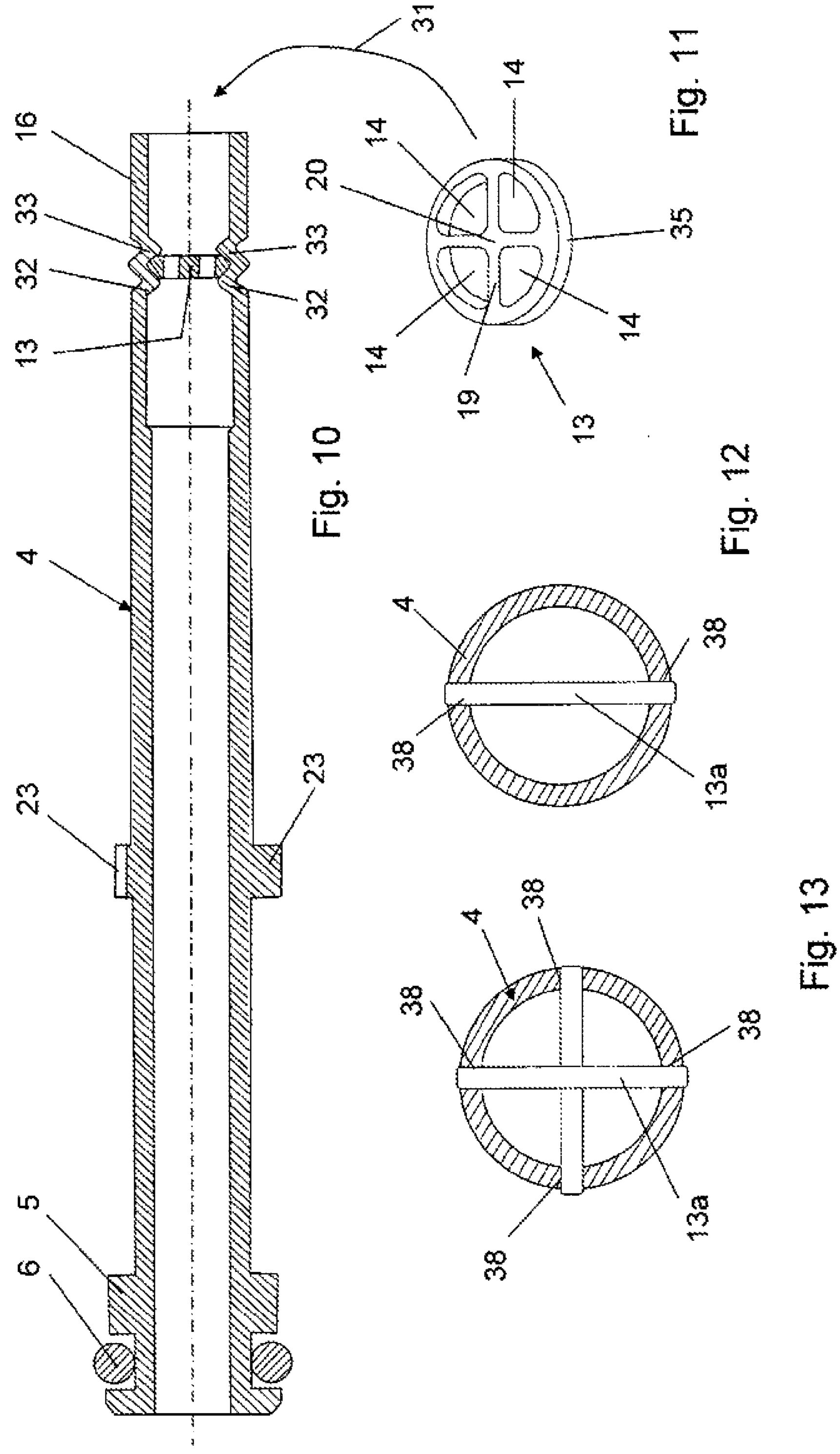
FIG. 10 shows an embodiment of a cooling tube with a releasably inserted spacer disk, modified from FIG. 3
FIG. 11 shows a perspective view of the spacer disk releasably inserted in FIG. 8
FIG. 12 shows a sectional view through the front end of the cooling tube with illustration of a wire or rod as a substitute for the spacer disk
FIG. 13 shows a sectional view through the front end of the cooling tube with illustration of a plurality of wires or rods as substitutes for the spacer disk

FIGS. 10 and 11 show a releasable fastening device on the spacer disk 13, wherein individual spacer knobs 32 which are distributed evenly on the circumference are formed by displacement of material from the material of the cooling tube, and at a distance from which further locking nobs 33, e.g. as three locking knobs evenly distributed on the circumference may be formed, whereby a locking receptacle between the knobs 32, 33 for locking engagement of a spacer disk 13 is created which is pushed in in the direction of arrow 31.

FIG. 11 shows as a modified embodiment that, instead of stop knobs 32, 33, an internal thread may be disposed at the same location in the cooling tube and the spacer disk 13 has a thread 35 on the outer circumference thereof, such that the spacer disk can be easily screwed with the external thread thereof into the internal thread of the cooling tube using a suitable tool, where it is thus fixed in place.

It is not shown in the drawing that the spacer disk 13 may also be clipped into an undercut groove incorporated on the inner circumference of the cooling tube or screwed into an internal thread incorporated therein.

It is also possible to incorporate a shoulder of reduced diameter on the inner circumference of the cooling tube and to move the spacer disk 13 with the outer circumference thereof in axial direction into engagement against this shoulder. The position of the spacer disk 13 at this shoulder can then be secured by means of a threaded ring screwed into the inner circumference, or by means of a snap ring which is snapped into a groove which is disposed in the axial direction in front of the shoulder holding the spacer disk.

FIGS. 12 and 13 show a sectional view through the front end of the cooling tube at the height of the spacer disk 13 shown in FIG. 10. FIG. 12 shows that the spacer disk 13 in the simplest form thereof can also be in the form of a wire or rod 13*a* transversely extending through the bore of the cooling tube. The wire or rod 13*a* is inserted, soldered or press fit into mutually aligned bores 38 in the cooling tube 4. The rod or wire 13*a* may be composed of plastic or metal.

FIG. 13 shows that also a plurality of intersecting wires or rods 13*a* may be inserted in the internal bore. Said parts can be snapped in place in an undercut groove on the inner circumference of the cooling tube. They can be connected to one another also in the middle region and form a cross which is locked or clamped into the undercut groove.

Drawing Legend

| | | |
|---|---|---|
| 1 | electrode body | |
| 2 | sealing device | |
| 3 | flange | |
| 4 | cooling tube | |
| 5 | flange | |
| 6 | gasket | |
| 7 | screw thread | |
| 8 | cooling channel (return flow) | |
| 9 | cooling channel (supply flow) | |
| 10 | direction of arrow | |
| 11 | electrode core | |
| 12 | electrode core holder | |
| 13 | spacer disk or spacer | 13a wires or rods |
| 14 | passage opening | |
| 15 | reverse path | |
| 16 | tip (of 4) | |
| 17 | direction of arrow | |
| 18 | outlet | |
| 19 | center cross | |
| 20 | stop surface | |
| 21 | direction of arrow | |
| 22 | direction of arrow | |
| 23 | pressure vanes a, b | |
| 24 | vortex flow | |
| 25 | pressure force | |
| 26 | stop surface | |
| 27 | bore bottom | |
| 28 | internal bore (of 1) | |
| 29 | threaded connection | |

-continued

| Drawing Legend | |
|---|---|
| 30 | torque |
| 31 | direction of arrow |
| 32 | stop knob |
| 33 | locking knob |
| 34 | internal bore (of 4) |
| 35 | thread (of 13) |
| 36 | ring |
| 37 | internal thread |
| 38 | bore |

What is claimed is:

1. A cooling tube for a plasma arc torch, wherein the cooling tube (4), on an inside thereof facing toward an electrode core holder (12) of an electrode body into which the cooling tube is inserted, comprises a circular spacer disk configured and placed within an inside of the cooling tube spaced from a front end (16) of the cooling tube (4) so as to directly contact with the electrode core holder in face-end engagement, wherein the circular spacer disk comprises a cross-bar extending along at least one diameter of the circular spacer disk and configured to engage a stop face (26) at a free end of the electrode core holder (12) such that a space is defined between the front end (16) of the cooling tube (4) and a bore bottom (27) of the electrode body (1) and the front end (16) of the cooling tube (4) extends beyond the electrode core holder (12) when the cooling tube (4) is inserted in the electrode core holder (12).

2. A cooling tube according to claim 1, wherein the circular spacer disk is connected integrally with the cooling tube (4).

3. A cooling tube according to claim 1, wherein the circular spacer disk (13) is releasably connected to the cooling tube (4).

4. A cooling tube according to claim 3, wherein the circular spacer disk (13) has an outer circumference that engages in a sealing manner against the inner circumference of the cooling tube (4), the coolant flow passing through the circular spacer disk (13).

5. A cooling tube according to claim 1, wherein on the outer circumference of the cooling tube (4) at least two pressure vanes (23, 23*a*, 23*b*, 23*c*, 23*d*) are disposed offset relative to one another, the at least two pressure vanes are acted upon by a cooling medium in a cooling channel (8) configured as a return passage and press the cooling tube (4) against an electrode-side fastening device.

6. A cooling tube according to claim 5, wherein the pressure vanes (23, 23*a*, 23*b*, 23*c*, 23*d*) are configured in such a way that a vortex flow (24) directed downstream of the cooling channel (8) can be generated.

7. A cooling tube according to claim 5, wherein the pressure vanes (23, 23*a*, 23*b*, 23*c*, 23*d*) are configured in such a way that an (axial) pressure force (25) directed in the longitudinal direction of the cooling tube (4) can be exerted on the fastening device of the cooling tube (4) on the electrode side in the electrode body (1).

8. A cooling tube according to claim 5, wherein the pressure vanes (23*a*) are configured as flaps tapered in the direction towards the longitudinal axis of the cooling tube (4).

9. A cooling tube according to claim 5, wherein the pressure vanes (23*b*) are configured as propeller wings tapered in the direction towards the longitudinal axis of the cooling tube (4).

10. A cooling tube according to claim 1, wherein the circular spacer disk comprises two perpendicular cross elements extending within the circular spacer disk defining passage openings through which the cooling medium can flow, the two perpendicular cross elements forming a center cross that directly abuts the electrode core holder.

11. A cooling tube for a plasma arc torch, comprising:

a circular spacer disk disposed on an inside of the cooling tube spaced from a front end (16) of the cooling tube (4) facing toward a central electrode core holder (12) extending longitudinally inward from a closed end of an electrode body into which the cooling tube is inserted, the circular spacer disk and comprising a cross-bar extending along at least one diameter of the circular spacer disk and configured and placed to directly contact a free end of the central electrode core holder in face-end engagement such that a space is defined between the front end (16) of the cooling tube (4) and a bore bottom (27) of the electrode body (1) and the front end of the cooling tube (4) extends beyond the electrode core holder (12) when the cooling tube (4) is inserted in the electrode core holder (12), and at least two pressure vanes (23, 23*a*, 23*b*, 23*c*, 23*d*) protruding from an outer circumference of the cooling tube (4) and disposed offset relative to one another, wherein the at least two pressure vanes are acted upon by a cooling medium in a cooling channel (8) configured as a return passage and thereby press the cooling tube (4) against an electrode-side fastening device.

12. A cooling tube according to claim 11, wherein the circular spacer disk comprises two perpendicular cross elements extending within the circular spacer disk defining passage openings through which the cooling medium can flow, the two perpendicular cross elements forming a center cross that directly abuts the electrode core holder.

13. A plasma arc torch comprising:

an electrode body having a central internal bore and a central electrode core holder integrally connected to and extending longitudinally from a closed end of the electrode body;

an electrode core inserted in the electrode core holder;

a cooling tube inserted into the electrode body and comprising a hollow bore through which a cooling medium flows in a direction toward the electrode core holder of the electrode body; and a circular spacer disk disposed on an inside of the cooling tube spaced from a front end (16) of the cooling tube (4) and comprising two perpendicular cross elements extending within the circular spacer disk defining passage openings through which the cooling medium can flow, the two perpendicular cross elements forming a center cross that directly abuts at a free end of the electrode core holder in face-end engagement such that a space is defined between the front end (16) of the cooling tube (4) and a bore bottom (27) of the electrode body (1) and the front end of the cooling tube (4) extends beyond the electrode core holder (12) when the cooling tube (4) is inserted in the electrode core holder (12).

* * * * *